United States Patent [19]

Desurvire et al.

[11] Patent Number: 4,794,598
[45] Date of Patent: Dec. 27, 1988

[54] SYNCHRONOUSLY PUMPED RING FIBER RAMAN LASER

[75] Inventors: Emmanuel Desurvire, Menlo Park; Herbert J. Shaw, Stanford, both of Calif.

[73] Assignee: The Board of Trustees of the Leland Stanford Junior University, Stanford, Calif.

[21] Appl. No.: 888,170

[22] Filed: Jul. 18, 1986

[51] Int. Cl.[4] .............................................. H01S 3/30
[52] U.S. Cl. ........................................ 372/3; 372/70; 372/6; 350/96.15
[58] Field of Search .............................. 372/6, 69, 70; 350/96.15

[56] References Cited

U.S. PATENT DOCUMENTS

| 4,401,364 | 8/1983 | Mochizuki | 350/96.16 |
| 4,469,397 | 10/1981 | Shaw et al. | |
| 4,473,270 | 10/1981 | Shaw | |
| 4,493,528 | 4/1980 | Shaw et al. | |
| 4,530,097 | 9/1982 | Stokes et al. | |
| 4,536,058 | 9/1981 | Shaw et al. | |
| 4,556,279 | 12/1985 | Shaw et al. | 350/96.15 |

FOREIGN PATENT DOCUMENTS 0104943  4/1984  European Pat. Off.
0139387  5/1985  European Pat. Off.

OTHER PUBLICATIONS

R. H. Stolen, "Fiber Raman Lasers", *Fiber and Integrated Optics*, vol. 3, No. 1, 1980.
R. H. Stolen, "Active Fibers", *New Directions in Guided Wave and Coherent Optics*, vol. 1, Martinus Nijhoff Publishers, Boston, 1984.
R. G. Smith, "Optical Power Handling ... Brillouin Scattering", *Applied Optics*, vol. 11, No. 11, Nov. 1972, pp. 2489–2494.
Dakss et al., "Amplified Spontaneous Raman Scattering and Gain in Fiber Raman Amplifiers", *J. of Lightwave Technology*, vol. LT-3, No. 4, 8/85, pp. 806–813.
D. Cotter, "Observation of Stimulated Brillouin Scattering ...", *Electronic Letters*, vol. 18, No. 12, pp. 495–496, 1982.
Aoki et al., "Bit Error Rate Evaluation of Optical ... in a Optical Fibre", *Electronics Letters*, vol. 21, No. 5, Feb. 28, 1985, pp. 191–193.
Mollenauer et al., "Experimental Demonstration of Soliton ... by Raman Gain", *Optics Letters*, vol. 10, No. 5, May 1985, pp. 229–231.

(List continued on next page.)

*Primary Examiner*—Léon Scott, Jr.
*Attorney, Agent, or Firm*—Knobbe, Martens, Olson & Bear

[57] ABSTRACT

An all-fiber ring laser has a single, uninterrupted length of single-mode optical fiber that is formed into a loop by using an optical coupler. Pump signal pulses at a first optical wavelength are introduced into one end of the optical fiber. Each pump pulse propagates through the loop formed in the fiber and then exits the fiber. The pump signal pulses excite the molecules of the optical fiber to cause them to go to a higher, unstable energy level. When the molecules return to a lower energy level, photons are emitted at a second optical frequency that has a wavelength that is shifted from the wavelength of the pump signal to form laser signal pulses. The coupler is a multiplexing coupler that has a first coupling ratio at the wavelength of the pump signal and has a second coupling ratio at the wavelength of the emitted optical signal. The first coupling ratio is preferably close to zero and the second coupling coefficient is greater than 0.5. The laser optical signal recirculates in the loop to stimulate further emission of optical energy at the shifted wavelength in phase with the recirculating optical signal. Each pump pulse is timed to enter the optical fiber loop in synchronism with the recirculating laser signal pulse so as to excite the fiber molecules so as to amplify the recirculating signal pulses. The laser signal has a loop transit time related to the time interval between pump pulses such that a multiple of the loop transit time is substantially equal to a multiple of the time interval.

24 Claims, 8 Drawing Sheets

OTHER PUBLICATIONS

"Raman Oscillation in Glass Optical Waveguide", Stolen et al., Applied Physics Letters, vol. 20, No. 2, Jan. 15, 1972, pp. 62–64.

"Low-Threshold cw Raman Laser", Hill et al., Applied Physics Letters, vol. 29, No. 3, Aug. 1, 1976, pp. 181–183.

"Fiber Raman Lasers", Stolen, NATO Summer Inst. on Fiber and Integrated Optics, Cargese, France, Jun. 1978, pp. 1–17.

Desurvire et al., "Theory and Implementation of a Raman Active Fiber Delay Line", *J. of Lightwave Technology*, vol. LT-4, No. 4, Apr. 1986.

Chinlon Lin et al., "A Tunable 1.1-$\mu$m Fiber Raman Oscillator," Applied Physics Letters, vol. 31, No. 2, Jul. 15, 1977, pp. 97–99.

John Auyeung et al., "Spontaneous and Stimulated Raman Scattering in Long Low Loss Fibers," IEEE Journal of Quantum Electronics, vol. QE-14, No. 5, May 1978, pp. 347–352.

R. H. Stolen et al., "A Fiber Raman Ring Laser," IEEE Journal of Quantum Electronics, vol. QE-14, No. 11, Nov. 1978, pp, 860–862.

Rogers H. Stolen, "Polarization Effects in Fiber Raman and Brillouin Lasers," IEEE Journal of Quantum Electronics, vol. OE-18, No. 10, Oct. 1979, pp. 1157–1160.

Bergh et al., "Single-Mode Fiber Optic Directional Coupler," Electronics Letters, vol. 16, No. 7, Mar. 27, 1980, pp. 260–261.

Ikeda, M., "Stimulated Raman Amplification Characteristics in Long Span Single-Mode Silica Fibers," Optics Communications, vol. 39, No. 3, Oct. 1, 1981, pp. 148–152.

S. A. Newton et al., "Single Mode Fiber Recirculating Delay Line," SPIE Conference, Jan. 1982, paper 326-21 (8 pages).

J. E. Bowers et al., "Filter Response of Single-Mode Fibre Recirculating Delay Lines," Electronics Letters, vol. 18, No. 3, Feb. 4, 1982, pp. 110–111.

Digonnet et al., "Analysis of a Tunable Single Mode Optical Fiber Coupler," IEEE Journal of Quantum Electronics, vol. QE-18, No. 4, Apr. 1982, pp. 746–753.

L. F. Stokes et al., "All-Single-Mode Fiber Resonator," Optics Letters, vol. 7, No. 6, Jun. 1982, pp. 288–290.

L. F. Stokes et al., "All-Fiber Stimulated Brillouin Ring Laser with Submilliwatt Pump Threshold," Optics Letters, vol. 7, No. 10, Oct. 1982, pp. 509–511.

Koepf et al., "Raman Amplification at 1.118 $\mu$m in Single-Mode Fibre and its Limitation by Brillouin Scattering," Electronics Letters, vol. 18, No. 22, Oct. 28, 1982, pp. 942–943.

Ohashi et al., "Phase-Matched Light Amplification by Three-Wave Mixing Process in a Birefringent Fiber Due to Externally Applied Strees" Applied Physics Letters, vol. 41, No. 12, Dec. 15, 1982, pp. 1111–1113.

M. Tur et al., "Spectral Structure of Phase—Induces Intensity Noise in Recirculating Delay Lines," SPIE, 1983.

Michel Digonnet et al., "Waveleng Multiplexing in Single-Mode Fiber Couplers," Applied Optics, vol. 22, No. 3, Feb. 1, 1983, pp. 484–491.

S. A. Newton et al., "High-Speed Pulse-Train Generation Using Single-Mode-Fibre Recirculating Delay Lines," Electronics Letters, vol. 19, No. 19, Sep. 15, 1983, pp. 756–758.

L. F. Mollenauer et al., "The Soliton Laser," Optics Letters, vol. 9, No. 1, Jan. 1984, pp. 13–15.

Nakazawa et al., "Active Transmission Line: Light Amplification by Backward-Stimulated Raman Scattering in Polarization-Maintaining Optical Fiber," Journal Optical Society of America B, vol. 1, No. 1, Mar. 1984, pp. 80–85.

A. R. Chraplyvy et al., "Synchronously Pumped $D_2$ Gas-in-Glass Fiber Raman Laser Operating at 1.56 $\mu$m," Optics Letters, vol. 9, No. 6, Jun. 1984, pp. 241–242.

Pocholle et al., "Nonlinear Optical Amplification in Single-Mode Fibers: Potential Applications to Optical Communications Systems," Conference on Lasers and Electro Optics, Paper FR1, Jun. 22, 1984.

M. Nakazawa, "Optical Amplification by Raman Effect in Silica Fiber," Conference on Lasers and Electro Optics, Paper FR2, Jun. 22, 1984.

R. H. Stolen et al., "Development of the Stimulated Raman Spectrum in Single-Mode Silica Fibers," Journal of the Optical Society of America B, vol. 1, No. 4, Aug. 1984, pp. 652–657.

Bingkun Zhou et al., "Efficient, Frequency-Stable Laser-Diode-Pumped Nd:YAG Laser," Optics Letters, vol. 10, No. 2, Feb. 1985, pp. 62–64.

OTHER PUBLICATIONS

Desurvire et al., "Raman Amplification of Recirculating Pulses in a Reentrant Fiber Loop," Optics Letters, vol. 10, No. 2, Feb. 1985, pp. 83-85.

Moshe Tur et al., "Theory of Laser Phase Noise in Recirculating Fiber-Optic Delay Lines," IEEE Journal of Lightwave Technology, vol. LT-3, No. 1, Feb. 1985, pp. 333-342.

E. Desurvire et al., "Raman Amplification in a Single-Mode Reentrant Fiber Loop," presented at the Third International Conference on Optical Fiber Sensor, Feb. 13-14, 1985, San Diego, Calif., Paper WBB5.

Masataka Nakazawa, "Synchronously Pumped Fiber Raman Gyroscope," Optics Letters, vol. 10, No. 4, Apr. 1985, pp. 193-195.

J. P. Pocholle et al., "Raman and Four Photon Mixing Amplification in Single Mode Fibers," Optical Engineering, vol. 24, No. 4, Jul./Aug. 1985, pp. 600-608.

W. V. Sorin et al., "Single-Mode-Fiber Ring Dye Laser," Optics Letters, vol. 10, No. 11, Nov. 1985, pp. 550-552.

M. J. F. Digonnet et al., "Theoretical Analysis of Optical Fiber Laser Amplifiers and Oscillators," Applied Optics, vol. 24, No. 3, Feb. 1, 1985, pp. 333-342.

E. Desurvire et al., "Signal-to-Noise Ratio in Raman Active Fiber Systems: Application to Recirculating Delay Lines" Journal of Lightwave Technology, vol. LT-4, No. 5, May 1986, pp. 560-566.

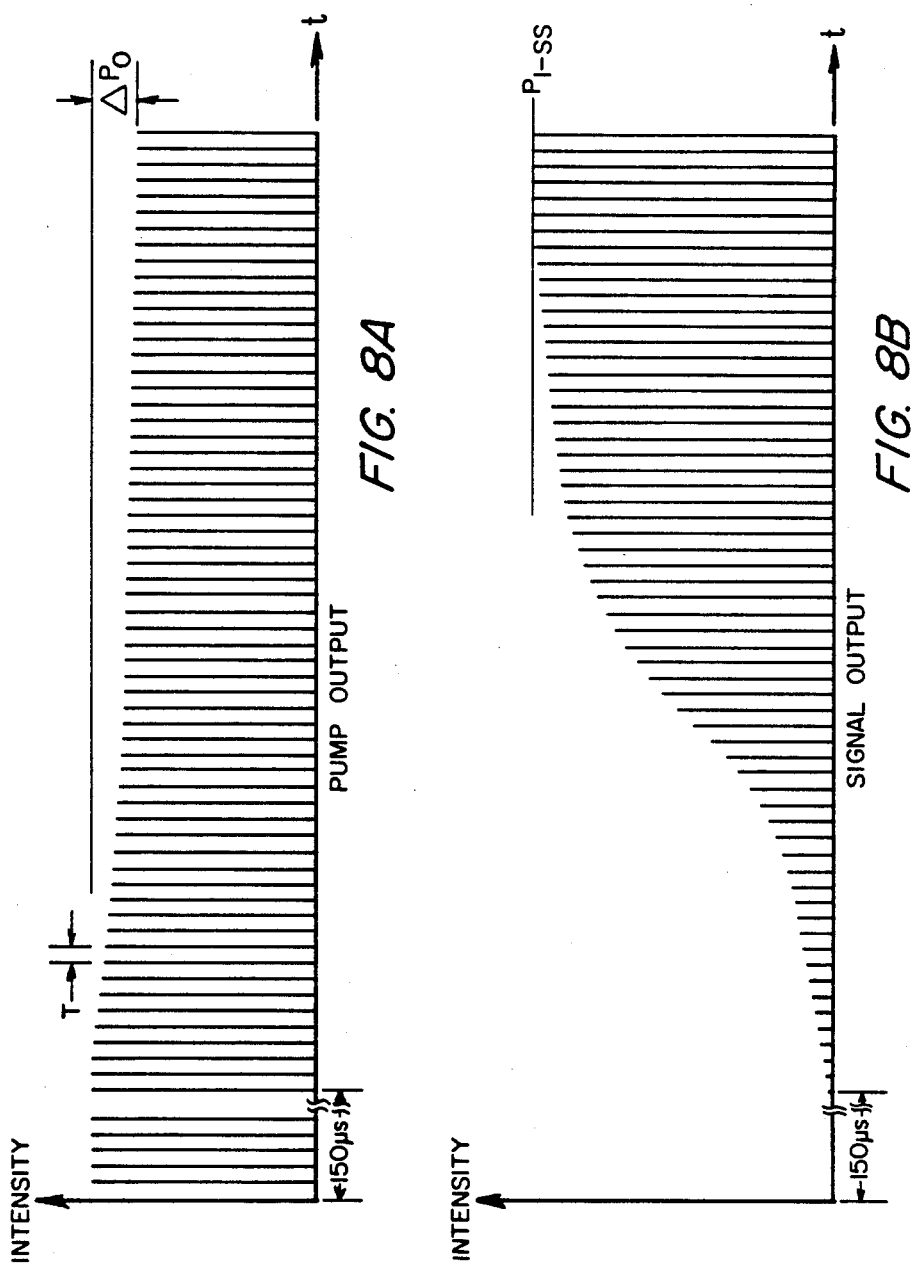

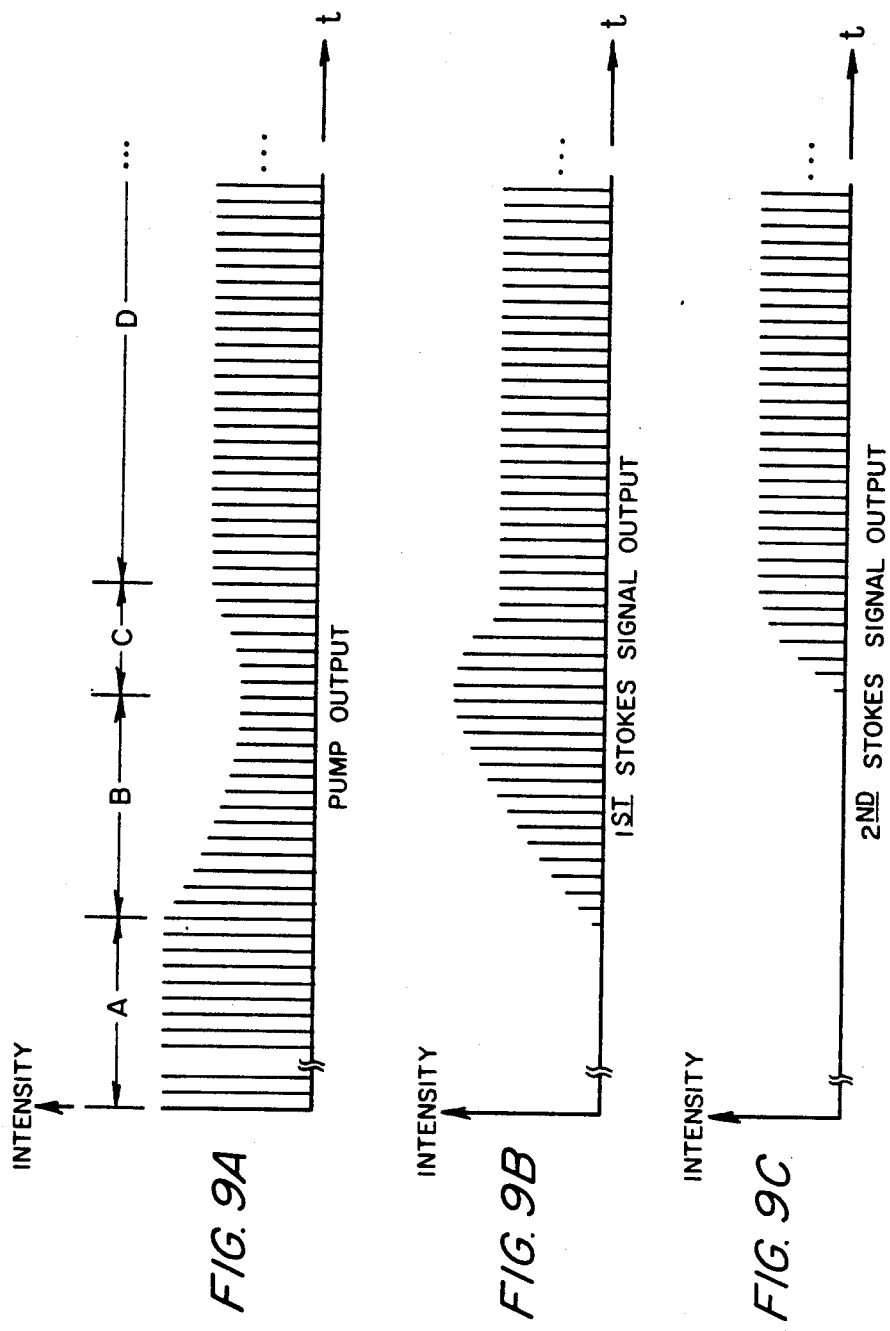

SYNCHRONOUSLY PUMPED RING FIBER RAMAN LASER

BACKGROUND OF THE INVENTION

The present invention relates generally to fiber optic devices, and particularly, to fiber optic lasers.

A few demonstrations of low threshold laser optical sources using ring fiber resonators have been reported, including: L. F. Stokes, et al., "All-Fiber Stimulated Brillouin Ring Laser With Submilliwatt Pump Threshold," *Optics Letters*, Vol. 7, No. 10, p. 509 (1982); E. Desurvire, et al., "Theory and Implementation of a Raman Active Fiber Delay Line," IEEE Journal of Lightwave Technology (April, 1986); and W. V. Sorin, et al., "Single Mode Fiber Ring Dye Laser," *Optics Letters*, Vol. 10, No. 11, p. 550 (1985). These low threshold laser optical sources were realized in all single-mode fiber versions by means of evanescent-field fiber couplers, such as those described by M. Digonnet, et al., in an article entitled "Analysis of a Tunable Single Mode Optical Fiber Coupler," IEEE Journal of Quantum Electronics, Vol. QE-18, No. 4, p. 746 (1982). Synchronously pumped fiber oscillators based on stimulated Raman scattering (SRS) have also been achieved in bulk optics. For example, such oscillators are described in the following articles: Chinlon Lin, et al., "A Tunable 1.1 $\mu$m Fiber Raman Oscillator," applied Physics Letters, Vol. 31, No. 2, p. 97 (1977); R. H. Stolen, et al., "A Fiber Raman Ring Laser," IEEE Journal of Quantum Electronics, Vol. QE-14, No. 11, p. 860 (1978); and A. R. Chraplyvy, et al., "Synchronously Pumped D2 Gas-In Glass Fiber Raman Case Operating at 1.56 $\mu$m," *Optics Letters*, Vol. 9, No. 6, p. 241 (1984).

SUMMARY OF THE INVENTION

The present invention is an apparatus and method for generating a laser signal. The apparatus includes a source of pump optical energy at a first wavelength for producing a series of pump energy bursts, preferably in the form of optical pump pulses, that are spaced apart in time by a selected time interval. The series of pump pulses are input into a length of optical fiber that is formed into a loop. As the pump pulses coupled into the loop propagate around the loop, the pump energy causes emission of Stokes light in the fiber at a second wavelength that is different from the wavelength of the pump pulses. The emitted light at the second wavelength comprises optical pulses that have substantially the same shape and duration as the pump pulses. The loop is optically closed upon itself by a coupling device that causes a substantial portion of the emitted optical signal to recirculate around the loop many times. The coupling device has a coupling ratio at the pump wavelength which causes the pump energy to circulate only once through the loop. In the preferred embodiment, the coupling device has a null coupling ratio (i.e., a coupling ratio substantially equal to zero) at the pump wavelength and a relatively high coupling ratio (e.g., between 0.5 and 1.0) at the Stokes wavelength. The recirculating laser signal has a loop transit time that is related to the time interval between the pump energy bursts such that a multiple of the loop transit time is substantially equal to a multiple of the time interval between the pump energy bursts. The recirculating laser signal thus propagates in synchronism with the input pump energy signals.

The source of pump optical energy is preferably a laser signal source that generates optical energy at the first wavelength. The pump energy bursts are formed by modulating the pump optical energy to create a modulated waveform. Preferably, the modulated waveform is a pulse that switches between an energy level substantially equal to zero and a predetermined maximum energy level.

A method of generating a laser output signal includes the generation of a pump signal that comprises a series of at least first and second adjacent optical energy bursts spaced apart in time by a time interval, and at least third and fourth adjacent energy bursts spaced apart in time by the same time interval. The pump signal has a first optical wavelength. The method further includes of inputting the first and second energy bursts of the pump signal into a loop of optical fiber. The loop has a loop propagation time for the light propagating in the loop that is a function of the wavelength of the light. The first and second energy bursts of the pump signal are propagated in the optical fiber loop to optically pump the fiber and cause emission of optical energy in the optical fiber at a second optical wavelength that is shifted from the first optical wavelength to provide a laser signal at the second optical wavelength. The third and fourth energy bursts are then input into the loop. The method further includes timing said third and fourth energy bursts to arrive at the loop subsequent to the first and second energy bursts, respectively, by a time equal to a multiple of the loop propagation time for said second wavelength. The laser signal is recirculated in the loop to stimulate further emission of optical energy in phase with the recirculating laser signal for amplification of the laser signal. A fraction of the laser signal from the loop is output after each recirculation to provide the laser output signal.

Due to the short coherence length of an exemplary pump signal, overlapping of a pump pulse with a subsequent pump pulse can cause interference between the two pump pulses. The interference can generate large fluctuations in the pump energy in the loop and concomitant pump noise and gain fluctuations. The pump noise and gain fluctuations can result in undesirable fluctuations in the laser output signal. In the preferred method of generating the laser output signal, substantially all of the pump signal is output from the loop after each pump signal has traversed the loop one time to avoid recirculation of the pump signal in the loop. Thus, the pump signals do not overlap in time and do not interfere with each other. The present invention thus provides a very stable laser signal source at the second optical wavelength.

In accordance with a further aspect of the invention, the pump signal may be adjusted to cause the recirculating laser signal to have a sufficiently high intensity so that it pumps the optical fiber. The recirculating laser signal then acts as a pump signal at the second wavelength, and causes emission of optical energy in the optical fiber at a third wavelength that is shifted from the second wavelength.

In the preferred apparatus and method of the present invention, the stimulated emission of optical energy caused by pumping the fiber is the result of Raman scattering.

BRIEF DESCRIPTION OF THE DRAWINGS

These and other aspects of the present invention may be more fully understood through reference to the drawings in which:

FIG. 8A is a graphical representation of the relative intensity of the pump signal output from the optical fiber loop of FIG. 1, showing the decrease in the intensity of the pump signal output caused by the conversion of a portion of the pump signal energy to energy at the first Stokes wavelength;

FIG. 8B is a graphical representation of the intensity of the first Stokes signal output showing the nonlinear increase in the intensity of the Stokes signal output, followed by the steady state level in the Stokes signal intensity;

FIG. 9A is a graphical representation of the pump signal output from the fiber loop in FIG. 1, showing a region of relatively constant intensity prior to the generation of the first Stokes signal output, followed by a region of decreasing intensity caused by the depletion of the pump signal as a portion of the energy is transferred to the first Stokes signal, followed by a region of increasing intensity as a portion of the first Stokes energy is transferred to the second Stokes signal, followed by a fourth region in which the pump signal output remains relatively constant after a balance is reach for the power conversions between the pump signal input and the two Stokes output signals;

FIG. 9B is a graphical representation of the first Stokes signal output, showing a first time region during which the first Stokes signal output increases nonlinearly, corresponding to the depletion region of the pump signal in FIG. 9A, followed by a second region when the first Stokes signal output decreases as a result of the transfer of energy to a second Stokes signal output, followed by a region where the first Stokes signal output is at a substantially steady-state level;

FIG. 9C is a graphical representation of the second Stokes signal output showing a nonlinear increase in the second Stokes signal output corresponding to the decrease in the first Stokes signal output, followed by a region of substantially steady state intensity;

DESCRIPTION OF THE PREFERRED EMBODIMENT

Figure 1:
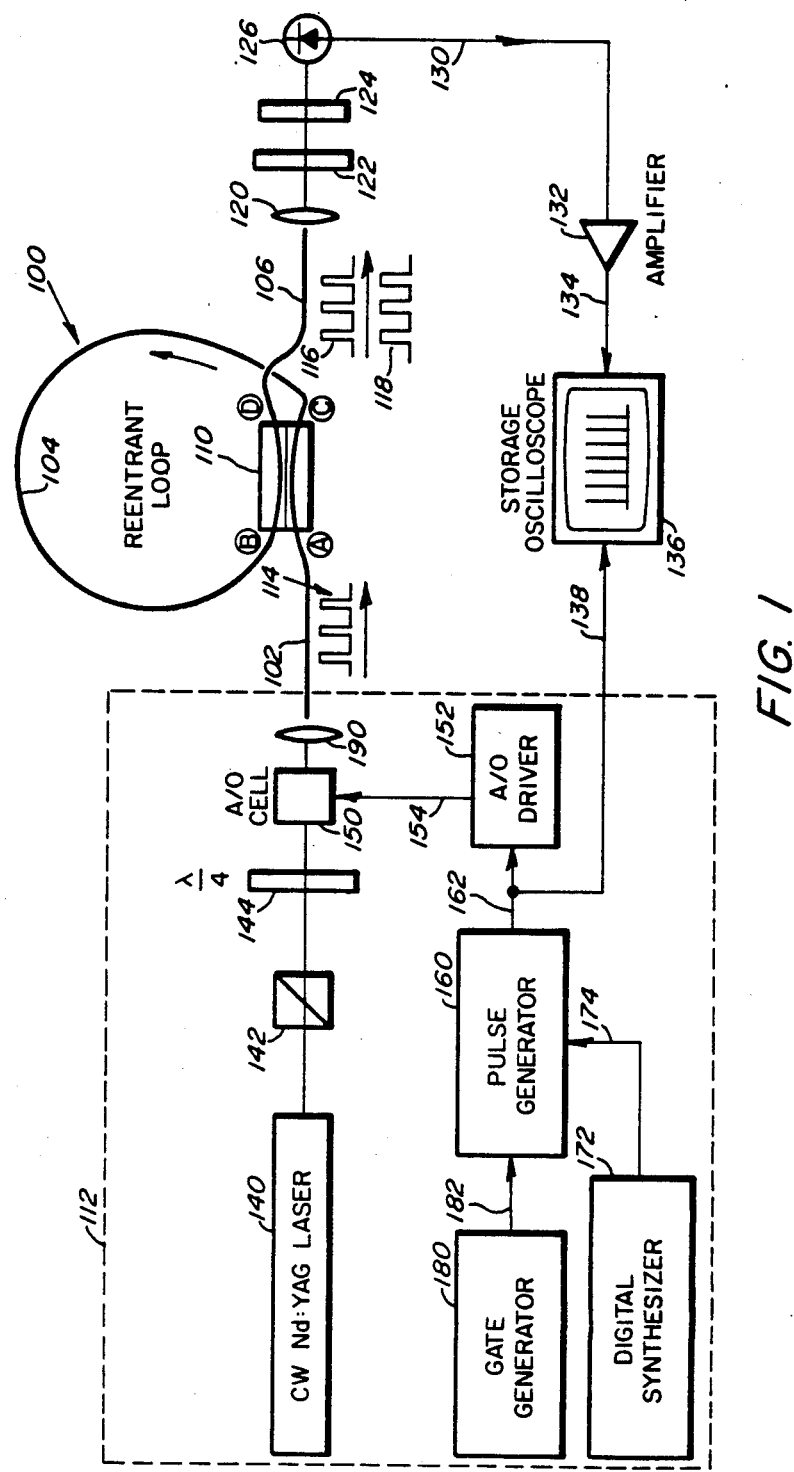
FIG. 1 is a schematic drawing of the preferred embodiment of the fiber optic laser of the present invention showing a reentrant optical fiber loop, and a pump signal generator for introducing a series of pump pulses into the fiber loop.

As shown in FIG. 1, the optical fiber laser of the present invention comprises a strand of optical fiber 100 that is preferably a continuous, uninterrupted strand of single-mode optical fiber. The optical fiber 100 has an input end portion 102, a loop portion 104 and an output end portion 106. At the ends of the loop portion 104, the optical fiber 100 is optically coupled together by means of a fiber optic, evanescent-field, four port, directional coupler 110, having a port A and a port B on one side thereof, and having a port C and a port D on the other side thereof. Tracing the fiber 100 from one end to the other, the fiber 100 first passes through the coupler 110 from the port A to the port C, and then through the coupler 110 from the port B to the port D, so that the loop portion 104 extends from the port C to the port B, while the input portion 102 extends from the port A, and the output portion 106 extends from the port D.

A pump pulse generator 112 is provided to selectively introduce a series of optical energy bursts at a pump wavelength 114 into the input end portion 102 of the fiber 100. The pump energy bursts are shown as a series of input pump pulses 114. The coupler 110 couples substantially all of the optical energy in the input pump pulses 114 to the loop portion 104 for propagation therein. In an exemplary embodiment of the present invention, the input pump pulses 114 have a pump optical wavelength of 1.064 microns. The coupler 110 preferably has a relatively low coupling ratio at the pump wavelength (e.g., close to zero) so that substantially all (i.e., close to 100%) of the optical energy in the input pump pulses 114 is coupled from port A of the coupler 110 to port C of the coupler 110 and thus to the loop portion 104 of the optical fiber 100. After propagating through the loop portion 104, the pump pulses return to the port B of the coupler 110, and substantially all of the optical energy remaining in the pump pulses is coupled to the port D of the coupler 110 and thus to the output end portion 106 of the optical fiber 100 as output pump pulses 116.

The wavelength and amplitude of the input pump pulses 114 are selected to cause stimulated scattering in the loop portion 104 of the optical fiber 100 at a wavelength that is shifted from the wavelength of the pump signal. As discussed in more detail hereinafter, such stimulated scattering produces Stokes photons at a wavelength referred to herein as the "Stokes wavelength." In the preferred embodiment, the Stokes photons are produced by stimulated Raman scattering (SRS) in the silica glass fiber 100, and the Stokes wavelength is 1.12 microns for a pump wavelength of 1.064 microns. The photons produced by this stimulated scattering propagate in the loop portion 104 of the optical fiber 100 at a velocity that is dependent upon the wavelength. The propagating Stokes photons form a laser optical signal that is comprised of a series of energy bursts or pulses corresponding to the pump energy bursts or pulses.

The coupler 110 has a relatively high coupling ratio at the Stokes wavelength so that a substantial fraction of the optical energy in the laser optical signal that enters the coupler 110 at the port B is coupled to the port C. This coupled fraction of the laser optical signal recirculates in the loop portion 104 of the fiber 100. The remaining fraction of the laser optical signal is output through the output end portion 106 of the fiber 100. In one exemplary embodiment, the coupling ratio of the coupler 110 at the exemplary Stokes wavelength of 1.12 microns is selected to be approximately 0.73. Thus, approximately 73 percent of the optical energy in the laser optical signal that enters the coupler 110 through the port B exits the coupler 110 through the port C, and approximately 27 percent exits the coupler 110 through the port D as a series of laser signal output pulses 118.

The output end portion 106 of the optical fiber 100 is directed toward a lens 120, which can be, for example, a 20x microscope objective, which focuses the light radiated from the output end portion 106 onto an interference filter 122. The interference filter 122 is selected to have a narrow linewidth (e.g., 30 nm) so as to pass only the optical energy at a selected wavelength. In the embodiment shown, the center wavelength of the interference filter 122 can be switched between either the 1.064 micron wavelength of the pump optical signal or at the 1.12 micron wavelength of the laser optical signal, to permit observation of either the laser signal output pulses 118 or the output pump pulses 116. After passing through the interference filter 122, the light at the selected wavelengths (1.064 microns or 1.12 microns) propagates to an attenuator 124 and then to a germanium photodetector 126. The germanium photodetector 126 converts the intensity of the optical signal at the selected wavelength to an electrical signal which is provided via a line 130 to an electronic amplifier 132. The output of the amplifier 132 is provided via a line 134 as an input signal to a storage oscilloscope 136. The storage oscilloscope 136 is connected via a line 138 to the pump pulse generator 112. The line 138 is activated in synchronism with the generation of the pump pulses 114 by the pump pulse generator 112 so that the oscilloscope 136 is triggered in synchronism with the input pump pulses 112. Thus, the storage oscilloscope 136 is advantageously used to view the intensity of the optical energy output from the output end portion 106 of the optical fiber 100 responsive to the pump input pulses 132. The magnitude signal displays on the oscilloscope 136 can be responsive to the energy remaining in the output pump pulses 116 or to the energy in the laser signal output 118, depending upon the selection of the center wavelength of the interference filter 122. Those skilled in the art will understand that, in practice, it is not necessary to observe both the output pump pulses 116 and the laser signal pulses 118, and that the interference filter 122 will normally be set to the 1.112 Stokes frequency for output of only the laser signal pulses 118.

In preferred embodiments of the apparatus of FIG. 1, the pump generator 112 comprises a polarized, continuous wave (cw) $Nd^{3+}$:YAG laser 140 that produces a polarized optical signal at a wavelength of 1.064 microns with a power output of approximately 10 watts in the $TEM_{00}$ mode. The output of the laser 140 is directed to a glan polarizer 142 and then to a quarter-wave plate 144. The glan polarizer 142 and the quarter-wave plate 144 ensure a 30 dB optical isolation of the laser 140 from any polarized light reflected from the fiber 100. After passing through the quarter-wave plate 144, the optical signal generated by the laser 140 is modulated by an acousto-optic Bragg cell 150 which is driven by an acousto-optic driver 152 via an electrical interconnection line 154. The acousto-optic driver 152 is electrically driven by a pulse generator 160 via an electrical interconnection line 162. The pulse generator 160 generates electrical pulses on the line 162 that have a high repetition rate (e.g., up to 1–3 MHz), and that have a short duration per pulse (e.g., as low as approximately 270 nanoseconds). When the output of the pulse generator 160 on the line 162 is active, the acoustic-optic driver 152 drives the acoustic-optic Bragg cell 150 such that the optical signal generated by the laser 140 propagates through the Bragg cell 150. When the output of the pulse generator 160 on the line 162 is inactive, the acoustic-optic drive 152 drives the acoustic-optic Bragg cell 150 such that the optical signal generated by the laser 140 is blocked by the Bragg cell 150. Thus, the acoustic-optic Bragg cell 150 and the acoustic-optic driver 152 operate as a high frequency on-off switch for the optical signal generated by the laser 140 that causes the optical signal to be modulated in accordance with the electrical output pulses generated by the pulse generator 160 on the line 162. The modulated optical signal from the acoustic-optic Bragg cell 150 is directed through a lens 164, which may advantageously be a 20x microscope objective, that is focused on the input end portion 102 of the optical fiber 100. Thus, the optical signal output from the Bragg cell 150 through the lens 164 comprises the series of spaced optical energy bursts that comprise the series of pump pulses 114.

The line 162 from the pulse generator 160 is electrically connected to the line 138 and thus to the trigger input of the oscilloscope 136, so that the oscilloscope 136 is synchronized to the pump input pulses 114 for test purposes.

Figure 2:
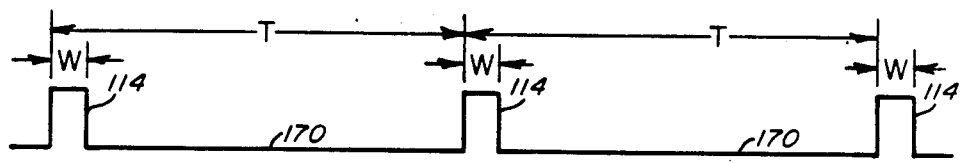
FIG. 2 is a graphical representation of the pump pulses produced by the pump signal generator of FIG. 1.

The pump pulses 114 are shown more clearly in FIG. 2. The pump pulses 114 have widths W that are substantially equal to the widths of the output pulses of the pulse generator 160 on the line 162. The pulses 114 are separated by intervals 170. Each pulse 114 and adjacent interval 170 occupy a time T that is determined by the pulse frequency of the pulse generator 160. As used herein, the pulses 132 are "spaced apart" by the time T and thus have a periodicity of time T. As set forth above, the acousto-optic driver 152 and the acousto-optic Bragg cell 150 are preferably adjusted so that the acousto-optic Bragg cell 150 has a maximum energy output during the duration of each pulse 114 and has substantially no energy output during each interval 170.

As further shown in FIG. 1, the frequency of the pulse generator 160 and thus the amount of time by which the pulses 132 are spaced apart is determined in the preferred embodiment by a digital synthesizer 172 that provides a variable frequency trigger input to the pulse generator 160 on an electrical interconnection line 174. Each cycle of the output of the digital synthesizer 172 on the line 174 causes the pulse generator 160 to generate a single pulse on the line 162 which causes the acoustic-optic driver 152 and the acoustic-optic Bragg cell 150 to operate together to enable the output of a single pump pulse 114 through the lens 162. The digital synthesizer 172 advantageously has a frequency resolution of 1 Hz, and thus has a timing resolution of better than 0.1 nanosecond at an operating frequency of approximately 200 KHz to 10 MHz.

The pump generator 130 preferably includes a gate generator 180 which provides an electrical signal output on an interconnection line 182 that is connected to an enable input of the generator pulse 160. The gate generator 180 provides a means for selectively enabling the pulse generator 160 for a predetermined period of time (e.g., 50 ms) and then disabling the pulse generator 160. The selective enabling and disabling of the pulse generator 160 are performed in the embodiment shown to duty cycle the pump optical energy applied to the fiber 100 to suppress the heating effects of the optical energy on the input end portion 102 of the optical fiber 100. For example, in one embodiment, the gate generator 180 enables the pulse generator 160 for 50 ms out of every 500 ms to provide a duty cycle of 1/10.

Figure 3:
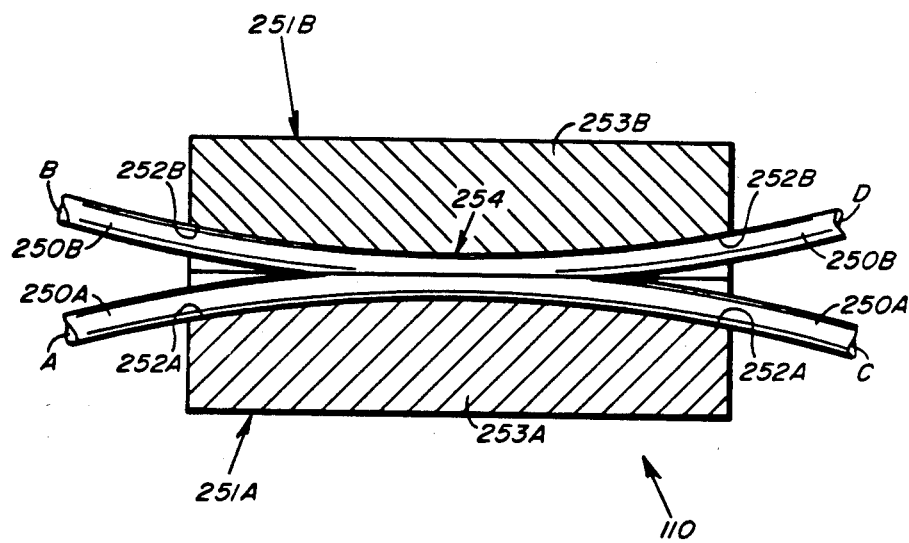
FIG. 3 is a sectional view of one embodiment of a fiber optic directional coupler for use in the optical fiber laser of FIG. 1.

A preferred fiber optic directional coupler for use as the coupler 110 (FIG. 1) in the fiber optic laser of the present invention is shown in FIG. 3. As illustrated therein, the coupler 110 includes two exemplary strands 250A and 250B of a single-mode fiber optic material mounted in longitudinal arcuate grooves 252A and 252B, respectively, formed in optically flat, confronting surfaces of rectangular bases or blocks 253A and 253B, respectively. The block 253A with the strand 250A mounted in the groove 252A will be referred to as the coupler half 251A, and the block 253B with the strand 250B mounted in the groove 252B will be referred to as the coupler half 251B. In the preferred embodiment, the strand 250A corresponds to that portion of the optical filter 100 interconnecting the input end portion 102 at the port A with the loop portion 104 at the port C. The strand 250B corresponds to that portion of the optical fiber 100 interconnecting the loop portion 104 at the port B with the output end portion 106 at the port D.

The arcuate grooves 252A and 252B have a radius of curvature which is large compared to the diameter of the strands 250, and have a width slightly larger than the fiber diameter to permit the strands 250, when mounted therein, to conform to a path defined by the bottom walls of the grooves 252. The depth of the grooves 252A and 252B varies from a minimum at the center of the blocks 253A and 253B, respectively, to a maximum at the edges of the blocks 253A and 253B, respectively. This advantageously permits the fiber optic strands 250A and 250B, when mounted in the grooves 252A and 252B, respectively, to gradually converge toward the center and diverge toward the edges of the blocks 253A, 253B, thereby eliminating any sharp bends or abrupt changes in direction of the fibers 250 which may cause power loss through mode perturbation. In the embodiment shown, the grooves 252 are rectangular in cross-section; however, it will be understood that other suitable cross-sectional contours which will accommodate the fibers 250 may be used alternatively, such as U-shaped cross-section or a V-shaped cross-section.

At the centers of the blocks 253, in the embodiment shown, the depth of the grooves 252 which mount the strands 250 is less than the diameter of the strands 250, while at the edges of the blocks 253, the depth of the grooves 252 is preferably at least as great as the diameter of the strands 250. Fiber optic material is removed from each of the strands 250A and 250B, e.g., by lapping, to form respective oval-shaped planar surfaces, which are coplanar with the confronting surfaces of the blocks 253A, 253B. These oval surfaces, where the fiber optic material is removed, will be referred to herein as the fiber "facing surfaces". Thus, the amount of fiber optic material that is removed increases gradually from zero towards the edges of the blocks 253 to a maximum towards the center of the blocks 253. This tapered removal of the fiber optic material enables the fibers to converge and diverge gradually, which is advantageous for avoiding backward reflection and excess loss of light energy.

In the embodiment shown, the coupler halves 251A and 251B are identical, and are assembled by placing the confronting surfaces of the blocks 253A and 253B together, so that the facing surfaces of the strands 250A and 250B are juxtaposed in facing relationship.

An index matching substance (not shown), such as index matching oil, is provided between the confronting surfaces of the blocks 253. This substance has a refractive index approximately equal to the refractive index of the fiber cladding, and also functions to prevent the optically flat surfaces from becoming permanently locked together. The oil is introduced between the blocks 253 by capillary action.

An interaction region 254 is formed at the junction of the strands 250, in which light is transferred between the strands by evanescent field coupling. It has been found that, to ensure proper evanescent field coupling, the amount of material removed from the fibers 250 must be carefully controlled so that the spacing between the core portions of the strands 250 is within a predetermined "critical zone". The evanescent fields extend into the cladding and decrease rapidly with distance outside their respective cores. Thus, sufficient material should be removed to permit each core to be positioned substantially with the evanescent field of the other. If too little material is removed, the cores will not be sufficiently close to permit the evanescent fields to cause the desired interaction of the guided modes, and thus, insufficient coupling will result. Conversely, if too much material is removed, the propagation characteristics of the fibers will be altered, resulting in loss of light energy due to mode perturbation. However, when the spacing between the cores of the strands 250 is within the critical zone, each strand receives a significant portion of the evanescent field energy from the other strand, and good coupling is achieved without significant energy loss. The critical zone includes that area in which the evanescent fields of the fibers 250A and 250B overlap with sufficient strength to provide coupling, i.e., each core is within the evanescent filed of the other. However, as previously indicated, mode perturbation occurs when the cores are brought too close together. For example, it is believed that, for weakly guided modes, such as the $HE_{11}$ mode in single-mode fibers, such mode perturbation begins to occur when sufficient material is removed from the fibers 250 to expose their cores. Thus, the critical zone is defined as that area in which the evanescent fields overlap with sufficient strength to cause coupling without substantial mode perturbation induced power loss.

The extent of the critical zone for a particular coupler is dependent upon a number of interrelated factors such as the parameters of the fiber itself and the geometry of the coupler. Further, for a single-mode fiber having a step-index profile, the critical zone can be quite narrow. In a single-mode fiber coupler of the type shown, the required center-to-center spacing between the strands 250 at the center of the coupler is typically less than a few (e.g., 2-3) core diameters.

Preferably, the strands 250A and 250B (1) are identical to each other; (2) have the same radius of curvature at the interaction region 254; and (3) have an equal amount of fiber optic material removed therefrom to form their respective facing surfaces. Thus, the fibers 250 are symmetrical, through the interaction region 254, in the plane of their facing surfaces, so that their facing surfaces are coextensive if superimposed. This ensures that the two fibers 250A and 250B will have the same propagation characteristics at the interaction region 254, and thereby avoids coupling attenuation associated with dissimilar propagation characteristics.

The blocks or bases 253 may be fabricated of any suitable rigid material. In one presently preferred embodiment, the bases 253 comprise generally rectangular blocks of fused quartz glass approximately 1 inch long, 1 inch wide, and 0.4 inch thick. In this embodiment, the fiber optic strands 250 are secured in the slots 252 by suitable cement, such as epoxy glue. One advantage of the fused quartz blocks 253 is that they have a coefficient of thermal expansion similar to that of glass fibers, and this advantage is particularly important if the blocks 253 and fibers 250 are subjected to any heat treatment during the manufacturing process. Another suitable material for the block 253 is silicon, which also has excellent thermal properties for this application.

The coupler 110 of FIG. 3 includes four ports, labeled A, B, C, and D, which corresponds to the ports A, B, C, and D, respectively, of the coupler 110 in FIG. 1. When viewed from the perspective of FIG. 3, the ports A and B which correspond to strands 250A and 250B, respectively, are on the left-hand side of the coupler, while the ports C and D, which correspond to the strands 250A and 250B, respectively, are on the right-hand side of the coupler. When the coupler 110 is formed on the optical fiber 100, the strand 250A corresponds to that portion of the optical fiber 100 that interconnects the input end portion 102 at the port A with the loop portion 104 at port B, and the strand 250B corresponds to that portion of the optical fiber 100 that interconnects the loop portion 104 at port C with the output end portion 106 at port D. As set forth above, pump input light is applied to the port A from the input end portion 102. This light passes through the coupler and is output at the port C and/or the port D, depending upon the amount of power that is coupled between the strands 250. In this regard, the term "coupling ratio" is defined as the ratio of the coupled power to the total output power. In the above example, the coupling ratio is equal to the ratio of the power at the port D to the sum of the power output at the ports C and D. This ratio is also referred to as the "coupling efficiency", and when so used, is typically expressed as a percent. Thus, when the term "coupling ratio" is used herein, it should be understood that the corresponding coupling efficiency is equal to the coupling ratio times 100. For example, a coupling ratio of 0.5 is equivalent to a coupling efficiency of 50%. The coupler may be "tuned" to adjust the coupling ratio to any desired value between zero and 1.0 by offsetting the facing surfaces of the blocks 253. Such tuning may be accomplished by sliding the blocks 253 laterally relative to each other, so as to increase the distance between the fiber cones.

The coupler is highly directional, with substantially all of the power applied at one side of the coupler being delivered to the other side of the coupler. That is, substantially all of the light applied to the input port A is delivered to the ports C and D, without contradirectional coupling to the port B. Likewise, substantially all of the light applied to the port B is delivered to the ports C and D. Further, this directivity is symmetrical, so that substantially all of the light applied to either the port C or the port D is delivered to the ports A and B. Moreover, the coupler is essentially non-discriminatory with respect to polarizations, and thus, preserves the polarization of the light. Thus, for example, if a light beam having a vertical polarization is input to the port A, the light cross-coupled from the port A to the port D, as well as the light passing straight through from the port A to the port C, will remain vertically polarized.

The coupler is also a low loss device, having insertion or throughput losses typically on the order of 2-3 percent. The term "insertion loss", as used herein, refers to the real scattering losses of light passing through the coupler, from one side to the other. For example, if light is applied to the port A, and 97% of that light reaches the ports C and D (combined), the insertion loss would be 0.03 (3%). The term "coupler transmission" is defined as one minus the insertion loss. Thus, if the insertion loss is 0.03 (3%), the coupler transimssion is 0.97 (97%).

Further details regarding this coupler are disclosed in U.S. Pat. No. 4,536,058, issued on Aug. 20, 1985, and U.S. Pat. No. 4,493,528, issued on Jan. 15, 1985, both of which are assigned to the assignee of the present invention. In addition, the coupler is described in the Mar. 29, 1980 issue of *Electronics Letters*, Vol. 16, No. 7, pages 260-261. The patents and the publication are hereby incorporated by reference herein.

The coupler 110 of FIG. 3 is specially adapted for use with the present invention to operate as a "multiplexing coupler", such that the coupler 110 exhibits significantly different coupling ratios for different wavelengths, even if the wavelength separation is quite small (e.g. on the order of a few tens of nanometers corresponding to a frequency separation of approximately 10 THz). By properly selecting the radius of curvature of the fibers and the core spacing therebetween the coupler can be made to provide virtually any desired coupling ratio for substantially any pair of wavelengths.

To further explain this aspect of the invention, it will be recalled that the coupler 110 operates on evanescent field coupling principles in which guided modes of the strands 250 interact through their evanescent fields to cause light to be transferred between the strands 250 at the interaction region 254. The amount of light transferred is dependent upon the proximity and orientation of the cores as well as the effective length of the interaction region 254. The length of the interaction region 254 is dependent upon the radius of curvature of the fibers 250, and, to a limited extent, the core spacing, although it has been found that the effective length of the interaction region is substantially independent of core spacing. However, the "coupling length" (i.e., the length within the interaction region 254 which is required for a single, complete transfer of a light signal from one fiber to the other) is a function of core spacing, as well as wavelength.

When the length of the interaction region 254 is increased, and/or the core spacing is decreased, so that the coupling length is shorter than the effective interaction length, a phenomenon referred to herein as "overcoupling" occurs. Under these circumstances, the light will transfer back to the strand from which it originated. As the interaction length is further increased, and/or the core spacing further decreased, the effective interaction length becomes a greater multiple of the coupling length, and the light transfers back to the other strand. Thus, the light may make multiple transfers back and forth between the two strands as it travels through the region 254, the number of such transfers being dependent on the length of the interaction region 254, the light wavelength, and the core spacing.

This phenomena permits selection of virtually any two coupling ratios for any two signals of different wavelengths. For example, by properly choosing the geometrical parameters for the coupler 110, one signal wavelength may be substantially totally coupled, while a second signal wavelength remains substantially uncoupled.

Figure 4:
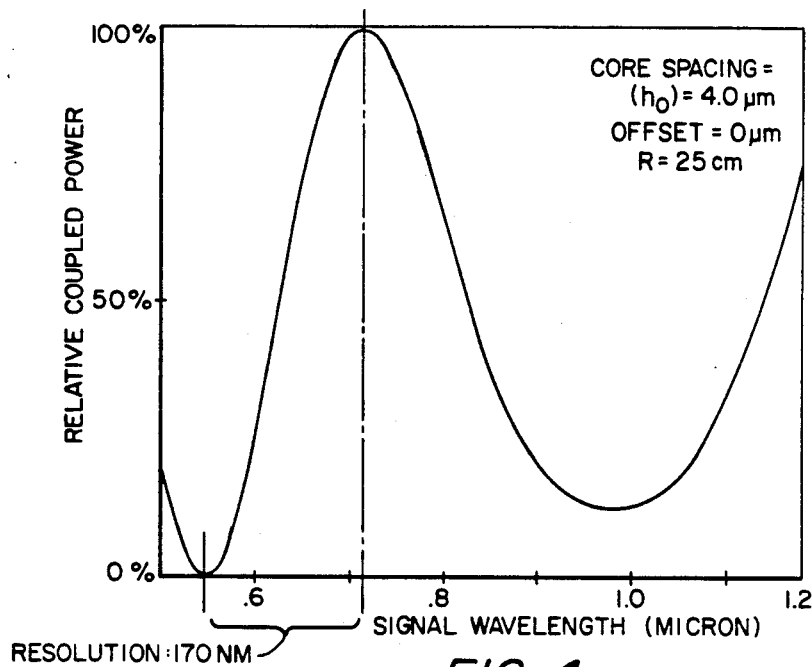
FIG. 4 is a graph showing relative coupled power versus signal wavelength for a fiber optic coupler having a minimum fiber spacing of four microns, an offset of the oval facing surfaces of zero microns, and a fiber radius of curvature of 25 cm.

To illustrate this wavelength dependence, FIG. 4 provides a plot of coupled power versus signal wavelength in the visible and near infrared spectrum for a particular coupler geometry. For this coupler configuration, the effective interaction length of the coupler is an odd multiple of the coupling length for the wavelength of 720 nm, but an even multiple of the coupling length for the wavelength of 550 nm. Thus, the wavelength of 720 nm will be 100% coupled, while the wavelength of 550 nm will be effectively uncoupled, yielding a wavelength resolution of 170 nm. Other wavelengths exhibit different coupling efficiencies. For example, a wavelength of 590 nm has a coupling efficiency of about 5-10% and a wavelength of 650 nm has a coupling efficiency of about 80-85%.

Figure 5:
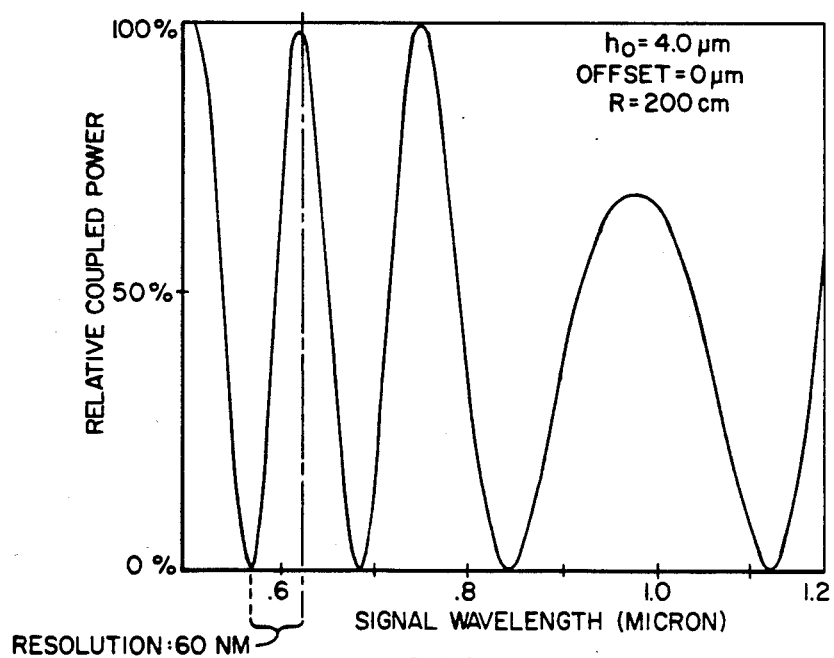
FIG. 5 is a graph of relative coupled power versus signal wavelength similar to that of FIG. 4, but for a fiber radius of curvature of 200 cm.

As the number of coupling lengths within the effective interaction length increases, the resolution of the multiplexing coupler is enhanced. Thus, by increasing the radius of curvature to increase the effective interaction length so that it becomes a higher multiple of the coupling length, resolution is improved. This result is illustrated in FIG. 5, which is comparable to the graph of FIG. 4, except that the radius of curvature has been increased from 25 cm to 200 cm. As expected, this increase in radius improves the coupler resolution near 600 nm from approximately 170 nm in the 25 cm radius case of FIG. 4 to approximately 60 nm in the 200 cm case.

After the resolution of the coupler has been set in accordance with the particular wavelengths of interest, the coupler may be tuned to precisely adjust the coupling length for the wavelengths to yield the desired coupling efficiencies. This is accomplished by offsetting the fibers by sliding the blocks 253A, 253B (FIG. 3) relative to each other in a direction normal to the axis of the fibers 250A, 250B. Such an offset has the effect of increasing the core spacing. If the required offset is small, it will not upset the resolution.

Figure 6:
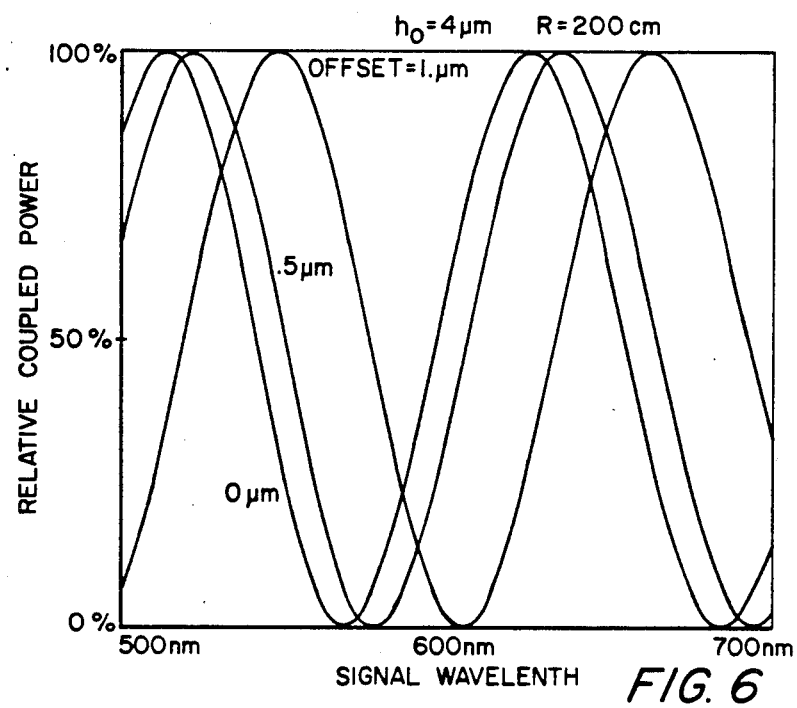
FIG. 6 is a graph of relative coupled power versus signal wavelength for a fiber optic coupler having a minimum fiber spacing of four microns, a fiber radius of curvature of 200 cm, and a selectable fiber offset.

To illustrate the tunability of multiplexing couplers, FIG. 6 provides a plot of relative coupled power versus wavelength for three increasing values of fiber offset (0 microns, 0.5 microns, and 1.0 microns). The curve is seen to shift toward increasing wavelengths as the offset increases, while the period of oscillation (or resolution) remains virtually unchanged. In this particular example in which the radius of curvature was 200 cm and the minimum core-to-core spacing was 4 microns, a one micron offset shifted the curve by approximately 45 nm.

Additional details of the above-described multiplexing coupler may be found in U.S. Pat. No. 4,556,279, issued on Dec. 3, 1985, and assigned to the assignee of the present invention. The wavelength dependencies of the above-described coupler are further discussed in an article by Digonnet, et al., entitled "ANALYSIS OF A TUNABLE SINGLE MODE OPTICAL FIBER COUPLER", *IEEE Journal of Quantum Mechanics*, Vol. QE-18, No. b 4 (April, 1982). The patent and the article are incorporated herein by reference.

Figure 7:
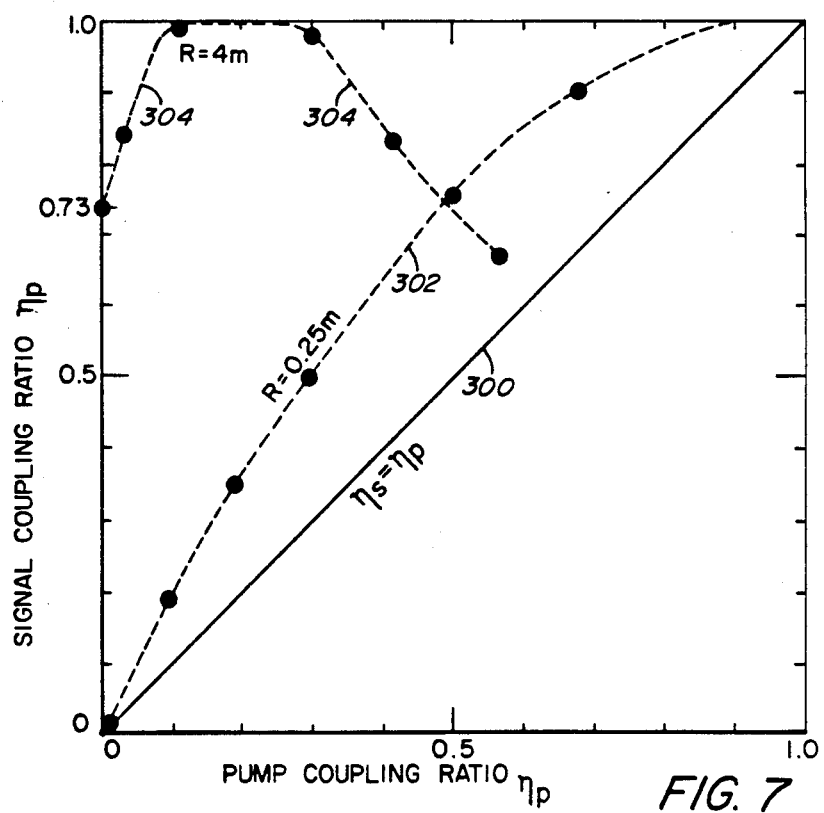
FIG. 7 is a graph of the signal coupling ratio $\eta_s$ at a wavelength of 1.12 microns as a function of the pump coupling ratio $\eta_p$ at a wavelength of 1.064 microns, measured experimentally with couplers made from the same fiber and having radii of curvature of 25 cm and 400 cm, respectively, showing that the fiber coupler multiplexing effect increases with the coupler radius of curvature.

As shown in FIGS. 4 and 5, the resolution of the coupled power with respect to signal wavelength increases (i.e., the wavelength difference between maximum coupled power and minimum coupled power decreases) as the radius of curvature of the two fiber strands 250A and 250B is increased. As also shown in FIGS. 4 and 5, the resolution is wavelength dependent, in that the resolution is less (the maxima and minima are farther apart) for longer wavelengths. In the preferred embodiments of the present invention, the radius of curvature of the strands 250 in FIG. 3 is selected to be approximately 400 cm to further increase the resolution at the higher wavelengths of 1.064 microns and 1.12 microns. The use of a 400 cm radius of curvature provides an interaction length of approximately 1 mm at a wavelength of 1.064 microns. This interaction length is approximately four times the interaction length obtainable by using a 25 cm radius of curvature. The coupler 110 is tuned in order to maximize the coupling ratio at the 1.12 micron Stokes wavelength and to minimize the coupling ratio at the 1.064 micron pump wavelength. FIG. 7 shows the relationship between the pump coupling ratio $\eta_p$ and the signal coupling ratio $\eta_s$. As shown in FIG. 7, the signal coupling ratio is plotted as a function of the pump coupling ratio as the coupler is tuned by varying the offset between the two fibers, as described above. The solid line 300 illustrates the two coupling ratios where the signal coupling ratio $\eta_s$ and the pump coupling ratio $\eta_p$ are equal. The first dashed line 302 illustrates the relationship between the signal coupling ratio $\eta_s$ and the pump coupling ratio $\eta_p$ at a radius of 25 cm. A second dashed line 304 represents the relationship between the signal coupling ratio $\eta_s$ and the pump coupling ratio $\eta_p$ at a radius of curvature of 400 cm. As shown in FIG. 7, the maximum difference between the signal coupling ratio $\eta_s$ and the pump coupling ratio $\eta_p$ for a 25 cm radius of curvature is approximately 0.25. This coupling ratio difference occurs when $\eta_s$ approximately equal to 0.75 and $\eta p$ is approximately equal to 0.5. In contrast, at a radius of curvature of 400 cm, the maximum coupling ratio difference is approximately 0.89 when $\eta s$ is approximately equal to 1.0 and $\eta_p$ is approximately equal to approximately 0.11. The amount of power coupled from the input pump pulses 114 (FIG. 1) into the loop portion 104 of the optical fiber 100 varies as 1.0-$\eta$p. In other words, as the pump coupling ratio $\eta_p$ decreases, less of the optical energy in the input pump pulses 114 is coupled from the port A to the port D of the coupler 110. Thus, it is particularly advantageous to reduce the pump coupling ratio $\eta_p$ to a very small number. In the example shown in FIG. 7, a signal coupling ratio $\eta s$ of approximately 0.73 corresponds to a pump coupling ratio $\eta_p$ that is measured to be approximately 0.002. Thus, virtually all of the optical energy in the input pump pulses 114 is coupled from the port A to the port C and thus enters the loop portion 104 of the optical fiber 100 to propagate in the loop portion 104. After propagating from the port C to the port B via the loop portion 104, the remaining energy at the 1.064 micron wavelength of the input pump signal is coupled from the port B of the coupler 110 to the port D of the coupler 110 and exits via the output end portion 106 of the optical fiber 100. Virtually none of the optical energy at the 1.064 micron pump wavelength is coupled from the port B to the port C of the coupler 110 to recirculate in the loop portion 104.

On the other hand, when the Stokes energy generated in the loop portion 104 enters the coupler 110 via the port B, approximately 73% of the optical energy at the 1.12 micron Stokes wavelength is coupled from the port B to the port C and thus back into the loop portion 104 of the optical fiber 100 to recirculate in the loop portion 104. Approximately 27% of the optical energy at the 1.12 micron Stokes wavelength is coupled to the port D of the coupler 100 to exit the loop via the output end portion 106. Thus, a portion, less than half, of the stimulated laser signal at the Stokes wavelength is provided as an output signal each time the stimulated laser signal circulates once around the loop portion 104. Such outputting of Stokes light each time the laser signal traverses the loop portion 104 reduces the magnitude of the laser signal which remains in the loop. The present invention compensates for such reduction in magnitude by synchronously inputting the series of input pump pulses 114 so that one pump pulse arrives at the coupler 110 each time a Stokes pulse arrives at the coupler 110. This synchronous inputting of the pump pulses results in amplification of the Stokes signal by an amount which compensates for the Stokes power output from the coupler 110 on the fiber portion 106. In order to achieve synchronous input of the pump pulses, the frequency of the electrical signal generated by the digital synthesizer 172 on the line 174 is precisely adjusted to drive the pulse generator 160 so that the pump input pulses 114 are spaced by the time T (FIG. 2). The spacing (T) is selected to be substantially equal to the loop transit time of the optical signal emitted by the optical fiber 100 at the Stokes wavelength of 1.12 microns. In one particular embodiment, the loop portion 104 of the optical fiber 100 has a length of 565 meters from the center of the interaction region 254 (FIG. 3) around the loop portion 104 and back to the center of the interacton region 254. At an effective refractive index of approximately 1.454 for the optical fiber 100, the loop transit time is approximately 2.74 microseconds, corresponding to a transit frequency of approximately 363.5 kHz (i.e., the stimulated optical signal circulates around the loop approximately 365.5 thousand times per second). The digital synthesizer 172 is adjusted to have an output frequency of approximately 363.5 kHz and is then precisely tuned so that each input pump pulse 114 enters the loop portion 104 at precisely the correct time to propagate around the loop portion 104 in substantial synchronism with the emitted optical energy stimulated by preceding pump input pulses 114. Thus, the recirculating Stokes signals will be amplified by the incoming pump pulses 114 so that rather than decaying, the recirculating signal pulses will be replenished, such that they reach a steady-state energy magnitude.

The foregoing can be further understood by the following brief analysis of the generation of an optical signal by pumping. Although various types of stimulated scattering processes are known, the preferred embodiment utilizes stimulated Raman scattering (SRS). As is well known in the art, stimulated Raman scattering is a phenomena in which coherent radiation is generated by optically pumping the molecules of a material, such as the silica glass used for the optical fiber 100, into excited vibrational states. The process may be viewed as a three-level laser emission process in which molecules of the active silica glass media are excited from the ground level to an excited virtual level by absorbing energy from input pump photons. Return to the excited molecules to an intermediate level results in the emission of photons, commonly referred to as "Stokes photons" which have a characteristic wavelength, commonly referred to as the "Stokes wavelength". In the case of SRS, the Stokes photons have a particular optical frequency relationship to the pump light which depends upon the molecular structure of the core of the optical fiber. For the preferred embodiment, which utilizes silica glass fibers, this frequency relationship causes the Stokes photons to be shifted in frequency relative to the pump signal by an amount, referred herein as the "Raman frequency shift", which, for SRS, is typically about 10 THz. The Raman frequency shift in SRS is due to the difference in energy between the incident pump photon and the vibrational level of the molecule. It should be noted that the transition of the excited molecules from the intermediate level back to the ground level results in emission of phonons, although such phonons are of little interest in the present invention, as they are quickly absorbed by the fiber and converted to heat.

The Raman frequency shift for a particular optical fiber is substantially constant irrespective of the pump frequency. Thus, if the pump frequency is changed, the stimulated Stokes signal will also change by a substantially equal frequency amount so that the difference in the Stokes frequency and the pump frequency remains, substantially constant. On the other hand, since the wavelength varies inversely to the frequency, the shift in wavelength between the pump signal and the Stokes signal is not constant and instead varies with the input pump wavelength. In the exemplary fiber used in the present invention, the shift in wavelength is approximately 56 nanometers when the input pump wavelength is 1.064 microns.

Those skilled in the art will understand that stimulated scattering processes are quite complex, and that the above description of amplification using stimulated Raman scattering is somewhat simplified. For example, those skilled in the art will recognize that the lifetime of the excited vibrational states of the molecules caused by pump photons is extremely short. Accordingly, a number of the excited molecules will return to the ground state spontaneously, resulting in the spontaneous emission of Stokes photons. The spontaneously emitted Stokes photons propagate in the loop portion 104 of the optical fiber 100 and stimulate the relaxation of additional molecules in the optical fiber 100. The Stokes photons generated by the stimulated relaxation have the same phase characteristics and frequency as the Stokes photons that stimulated the molecules. Thus, as the emitted photons propagate around the loop portion 104 with the pump signal pulses, increasing numbers of Stokes photons will be emitted because of the stimulation of additional photons by the previously emitted photons. A laser signal pulse will thus be gradually generated at the Stokes frequency and wavelength. Since all the molecules of the optical fiber 100 do not have precisely the same Stokes frequency shift, the generated pulse will have a finite linewidth, and thus a finite frequency bandwidth, caused by the stimulated emission of Stokes photons at a number of discrete frequencies.

As set forth above, when the stimulated optical signal at the Stokes wavelength of 1.12 microns reaches port B of the optical coupler 110, approximately 73% of the stimulated signal is coupled to port C and thus re-enters the loop portion 104 of the optical fiber 100. At the same time, a new pump pulse 114 enters the coupler 110 via the port A from the input end portion 102 and propagates to the port B to circulate once around the loop portion 106 in synchronism with the recirculating signal pulse generated by previous pump pulses. The recirculating laser signal at 1.12 microns stimulates the emission of Stokes photons by the molecules excited by the pump pulse 114. The stimulated Stokes photons have phase characteristics and a frequency substantially equal to the recirculating signal pulse. After a short amount of time the number of Stokes photons generated by the stimulated emission greatly exceed the number of photons generated by spontaneous emission so that the signal pulse comprises primarily photons having coherent phase and frequency characteristics. Thus, the synchronous pumping of the optical fiber 100 causes it to emit laser light at the Stokes wavelength to produce a recirculating laser signal that is output as the laser output signal pulses 118.

As the signal pulse continues to recirculate in the loop portion 104, it continues to be amplified by the synchronous excitation of molecules pumped by the incoming pump pulses 114. After a number of recirculations (e.g., 55) recirculations in the loop portion 104, the stimulated optical signal at the Stokes wavelength increases to an appreciable energy magnitude. This is illustrated in FIGS. 8A and 8B which represent the intensities of the energy in the pump output pulses 116 and the laser output signal pulses 118, respectively, as detected by the germanium diode detector 206 in FIG. 1 and as displayed as magnitude levels on the oscilloscope 136. (The amplitudes of the pulses in FIGS. 8A and 8B are not necessarily on the same scale. One skilled in the art will understand that the relative intensity of the signal output pulses in FIG. 8B is less than that of the pump pulses in FIG. 8A.) The pulses shown in FIG. 8A represent the intensity of the pump output signal pulses 116 spaced apart by approximately 2.74 microseconds. As illustrated, the time line (i.e., the horizontal axis) is broken so that the first 150 microseconds (i.e., the first 55 or so pulses) is not shown in its entirety. Referring to FIG. 8B, one can see that the laser output signal pulses 118, represented by the magnitude pulses in FIG. 8B initially start at a very low, substantially immeasurable magnitude. After approximately 150 microseconds (i.e., approximately 55 pump pulses), the intensity of the optical energy in the laser signal output pulses 118 begins to increase. Thereafter, the intensity of the laser signal output pulses 118 increases nonlinearly until the intensity reaches a steady state magnitude, shown as $P_{l\text{-}ss}$ in FIG. 8A. As the laser signal output pulse intensity increases, the intensity in the pump power output pulses 116 decreases because greater portions of the energy in the input pump pulses 114 is converted to energy in the stimulated Stokes photons. When the laser signal output power reaches its steady state condition $P_{l\text{-}ss}$, the pump signal output intensity is approximately 20% below the maximum intensity of the pump signal output. Thus, approximately 20% of the pump power that is not lost in the loop by attenuation is converted to power in the laser signal output. This difference is shown as $\Delta P_p$ in FIG. 8A. The pump power converted to Stokes signal power is referred to as the pump depletion per cavity pass. The pump power depletion causes gain saturation in the loop which results in the steady-state laser signal power level $P_{l\text{-}ss}$ as illustrated in FIG. 8B.

The linewidth of the simulated laser signal depends upon the linewidth of the input pump pulses 114, and also depends upon the combined effects of the frequency selective Raman gain of the fiber 100 and fiber dispersion as the stimulated laser signal recirculates in the loop portion 104. For example, in the embodiment described herein, the output of the laser 140 in the pump signal generator 112 has a linewidth of approximately 6 Angstroms (0.6 nanometers) at the center wavelength of 1.064 microns. The stimulated laser signal circulating in the loop portion 104 initially starts with a linewidth of approximately 10 nanometers and narrows rapidly to a linewidth of approximately 2.5 nanometers.

The linewidth narrowing is due to the combined effects of the frequency selective Raman gain and the stimulated scattering process. The latter effect is caused by the increasing concentrations of Stokes photons that are generated by stimulated emission rather than by the spontaneous emission of the excited molecules of the fiber 100. Thus, the stimulated photons will be concentrated at wavelengths at or near the center wavelength determined by the Raman shift at the center wavelength of the input pump signals 114. The former effect is a result of the dispersion of wavelengths as the stimulated laser optical signal circulates around the fiber loops. As is well known in the art, the velocity of an optical signal in a medium is determined by the refractive index of the medium. The refractive index of the medium, such as the optical fiber 100, varies in accordance with the wavelength of an optical signal propagating therein. Thus, the propagation velocities of the optical wavelengths comprising the laser optical signal circulating in the loop will vary in accordance with wavelengths. For example, at the center wavelength of 1.12 microns, the propagation time for two optical signals separated by 1 nanometer in optical wavelength varies by approximately 10 picoseconds per kilometer. (i.e. $\Delta t_p = 10$ ps/nm·km, where $\Delta t_p$ is the difference in propagation time). Consequently, two signals separated by one nanometer in wavelength will be separated in time by 5.65 picoseconds after propagating one time around the 565 meter length of the loop portion 104 of the optical fiber 100. After 1,000 circulations, the two signals will be separated in time by 5.6 nanoseconds, and after 10,000 recirculations, the two signals will be separated by 56 nanoseconds. Accordingly, one can see that as the number of recirculations increases and as the wavelength separation of two signals increases, the time spacing between two signals becomes quite substantial. For example, if the two signals were separated in wavelength by 10 nanometers, the two signals would be separated in time by 56 nanoseconds after 1,000 recirculations and by 560 nanoseconds after 10,000 recirculations. Thus, if a pump pulse 114 is utilized having a narrow time width (e.g., a pulse width of approximately 100 nanoseconds), and the frequency synthesizer 180 (FIG. 1) is precisely adjusted to match the loop transit time of the selected center frequency of the stimulated laser optical signal, the signals at wavelengths other than the selected center wavelength will gradually diverge from the center wavelength and will eventually enter the loop portion 104 at a time either before or after and incoming pump pulse 114. Therefore, the recirculating laser signal at wavelengths separated from the center wavelength will not be in synchronism with the incoming pump pulse 114. Since the presence of the pump pulse 114 is necessary to excite the fiber molecules to a higher energy level so that the recirculating optical signal will stimulate emission at the frequency of the optical signal, the optical signal that circulates either before or after the pump signal will not be amplified and will thus decay rapidly. Accordingly, the use of the synchronized pump signal 114 has the effect of selectively amplifying only the spontaneous and stimulated optical signals within a narrow linewidth range about a selected center frequency. The frequency of the digital synthesizer 180 can be adjusted to vary the selected center frequency of the laser optical signal by effectively matching the incoming pump pulses 114 with a laser optical wavelength having either a longer or shorter propagation time around the looped portion 104. The foregoing effect is referred to as dispersion tuning.

In the present invention, less than 0.2 percent of the energy in the input pump signals 114 recirculates in the loop portion 104. Such a low level of pump recirculation is highly advantageous in that it avoids unwanted pump power interaction. It has been found that interaction among recirculating pump signals can cause instability in the pump power in the loop. By suppressing the recirculation of pump signals, as described above, the pump intensity in the loop is highly stable. After the steady-state time (i.e., the time after which the laser output signals have reached a substantially steady-state power level ($P_{l-ss}$) has been reached, the stability of the Stokes pulses is very high. The pulse-to-pulse Stokes power stability has been measured to be approximately 1 percent over a 0.2 millisecond duration, and less than 0.5 percent over shorter durations. Because of the relatively large coupling ratio for the recirculating signal pulse (e.g., approximately 0.73 in the preferred embodiment), the laser output signal pulses 118 reach a steady state intensity magnitude with a relatively low threshold value for the input pump pulses. For example, it has been determined experimentally for the apparatus shown in FIG. 1 that generation of the laser output pulses 118 requires a peak input power threshold value of only about 740 milliwatts. This low threshold value is believed to be the result of the combination of using the splice-free loop of fiber having a low power loss (e.g., attenuation of approximately 1.04 db/km at the signal wavelength), and using a coupler having a low insertion loss (e.g., less than 2.5 percent at the signal wavelength). Furthermore, the coupling ratio of less than 0.002 at the pump wavelength is particularly advantageous in that substantially all of the power in the pump signal pulses 114 is input into the loop to excite the optical fiber molecules.

It has been determined experimentally that a peak input pump power of 970 milliwatts at 1.064 microns produces an output power of approximately 280 milliwatts at the Strokes wavelength of 1.12 microns. Similarly, an input pump power of approximately 1.55 watts generates an output Stokes power of approximately 800 milliwatts. At this power output level, the steady state Strokes power output is reached after about the 35th pump pulse in comparison with reaching the steady state power output after about the 77th pump pulse when the input pump power is approximately 970 milliwatts peak power.

It has been found that with peak input pump powers greater than approximately 946 milliwatts, multistokes scattering is observable. At this pump power, the first order Stokes pulses are sufficiently powerful to pump the fiber to generate a second order Stokes pulse train at a wavelength that is shifted from the wavelength of the first order Stokes pulse train. In the preferred embodiment described herein, the second order Stokes pulses have an optical wavelength of 1.18 microns. When the peak input pump power is increased to 1.55 watts, the peak power of the second order Stokes pulses is measured to be 160 milliwatts which is approximately equal to 20 percent of the measured output power in the first order Stokes pulses 118 (FIG. 1).

The operation of the present invention in generating multistokes output is illustrated in FIGS. 9A, 9B and 9C. In FIG. 9A, the energy intensity of the pump output pulses 116 is illustrated by the amplitude of the pulses as in FIG. 8A. (Again, the amplitude of the pulses in FIGS. 9A, 9B and 9C are not necessarily shown on the same scale.) The pump output signals comprise four distinct regions A, B, C and D. The region A corresponds to the undepleted pump region. During the time corresponding to the region A, the stimulated Stokes photons at the first Stokes wavelength (i.e., 1.12 microns) is gradually increasing, but the total intensity of the Stokes photons is initially immeasurable. The amount of power transferred from the pump signal pulses 114 to the stimulated Stokes signals in the loop portion 104 does not have a substantial effect on the amount of power remaining in the pump power output pulses 116 coupled from the loop portion 104 to the output in portion 106 of the optical fiber 100. Thus, the intensity of the pump output pulses during the region A is substantially constant. During the region B, the number of Stokes pulses at the first Stokes wavelength begin to increase to a measurable amount. FIG. 9B shows the nonlinear build-up of the first Stokes pulse train 118 to a saturation level shown as $P_{sat}$. At the same time, a significant amount of the energy in the pump signals circulating in the loop portion 104 is transferred to the Stokes signal pulses circulating in the loop portion 104 and results in pump depletion as evidenced by the decrease in the pump output pulses 116 in FIG. 9B. As the first Stokes signal pulses increase in intensity, the amount of energy circulating in the loop portion 104 at the first Stokes wavelength (i.e., 1.12 microns) increases to a threshold power magnitude sufficient to excite the optical fiber molecules and cause the spontaneous emission of Stokes photons at a second Stokes wavelength (e.g., 1.18 microns). The spontaneously emitted Stokes photons at 1.18 microns wavelength stimulate the emission of further Stokes photons having substantially the same phase and frequency characteristics, thus generating a laser signal pulse at 1.18 microns. It was determined experimentally that the coupling ratio at the second Stokes wavelength (i.e., $\eta_{s2}$) was approximately 0.68, which is close to the coupling ratio $\eta_s$ for the first Stokes wavelength. Thus, a substantial portion of the optical energy at the second Stokes wavelength recirculates in the loop portion 104. Optical energy is therefore transferred from the first Stokes signal pulses circulating in the loop portion 104 to the second Stokes signal pulses circulating in the loop 104. When the second Stokes signal pulses increase in magnitude to a measurable amount, the energy in the first Stokes signal output pulses 118, illustrated by the amplitude of the oscilloscope trace in FIG. 9B, at the region C, show a concomitant decrease in optical energy as a result of depletion of the first Stokes signal pulses. There is also a concomitant increase in the energy in the pump signal output pulses 116 as a result of less energy being transferred to the first Stokes signal pulses in the loop portion 104. An energy balance is reached for the power conversions between the pump pulses and the first and second Stokes pulses at a time represented by the fourth region D. So long as the pump power input remains at a steady state level, the pulses in region D will continue.

The second Stokes signal output pulses have a measured pulse width (i.e., time width of approximately 200 nanoseconds±10 nanoseconds, as compared to the pulse width of approximately 270 nanoseconds for the input pump pulses 114 and approximately 180 nanoseconds for the first Stokes output pulses 118 (FIG. 1).

As set forth above, the first Stokes output pulses 118 have a linewidth that narrows rapidly from approximately 10 nanometers to approximately 2.5 nanometers within the first thirty recirculations (approximately 80 microseconds delay) and then remains nearly constant. In contrast, the second Stokes linewidth initially is approximately 16 nanometers and then narrows to approximately 9 nanometers until saturation is reached. Thereafter, the linewidth of the second Stokes output pulses increase from about 9 nanometers to about 15 nanometers. The relatively large linewidth of the second Stokes pulses is attributable in part to the relatively large linewidth of the first Stokes pulses that pump the fiber molecules to generate the second Stokes pulses. The first Stokes pulse linewidth is 2.5 nanometers in comparison with the 0.6 nanometer linewidth of the pump pulses that cause the first Stokes pulses. The increase in the second Stokes linewidth is attributed to the combined effect of fiber dispersion and the Stokes pulse repetition rate. With increasing numbers of recirculations, the group velocity dispersion progressively reduces the time overlapping of the first and second Stokes pulse train, which results in a change in the second Stokes oscillating wavelength and linewidth. Unlike the relationship between the first Stokes pulses and the pump input pulses 114, wherein the pump input pulses 114 are spaced apart in time so that they enter the loop portion 104 in synchronism with the first Stokes signal pulses, the first Stokes signal pulses are spaced apart in time by the fixed loop transit time of the loop portion 104 at the first Stokes wavelength. Since the second Stokes pulses recirculating in the loop have a wavelength that differs by approximately 60 nanometers from the first Stokes wavelength, the second Stokes pulses travel around the loop portion 104 in approximately 339 picoseconds less time than the first Stokes pulses. Thus, after approximately 100 recirculations, the initially generated second Stokes pulses are approximately 33 nanoseconds ahead of the first Stokes pulses. The linewidth of the second Stokes pulses, therefore, increases at a relatively rapid rate compared to the substantially stable linewidth of the first Stokes pulses.

Figure 10A:
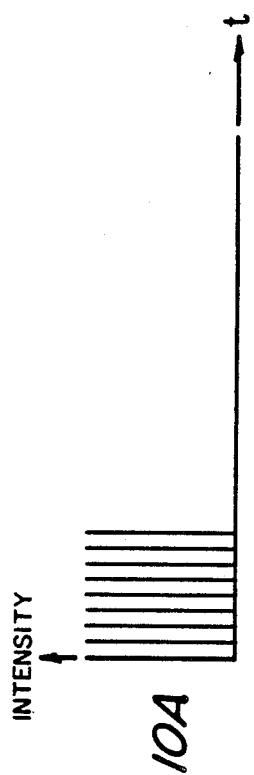
FIG. 10A, FIG. 10B, and FIG. 10C are graphical representations of the pump signal output, the first Stokes signal output, and the second Stokes signal output, respectively, when the pump signal input pulses are terminated, showing the immediate termination of the pump signal output in FIG. 10A, the gradual decay in the first Stokes signal output in FIG. 10B, and the gradual decay of the second Stokes signal output in FIG. 10C.
Figure 10B:
Figure 10C:
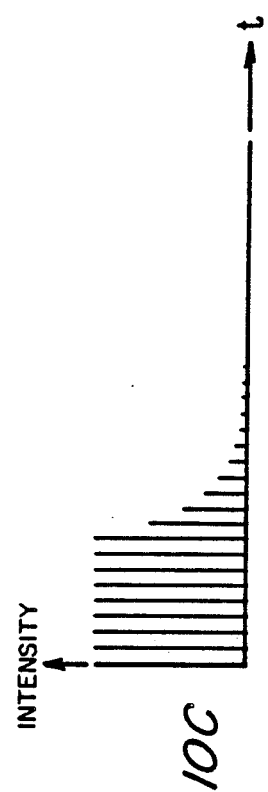

When the pump input pulses are terminated at the end of, for example, 50 milliseconds, the pump output pulses 118 terminate immediately thereafter (i.e., the last pump output pulse 116 occurs approximately 2.74 microseconds after the last pump input pulse 114 enters the loop portion 104). The first Stokes signal output pulses and the second signal output pulses will continue to occur as the pulses will recirculate in the loop portion 104 for an amount of time determined by the coupling ratios. For example, FIG. 10A illustrates the termination of the pump output pulses 116, FIG. 10B illustrates the decay of the first Stokes signal output pulses, and FIG. 10C illustrates the decay of the second Stokes signal output pulses, for coupling coefficients of $\eta_p = 0.002$, $\eta_s = 0.73$ and $\eta_{s2} = 0.68$. One skilled in the art will understand that if the coupler 110 is selectively adjusted so that the coefficient $\eta_{s2}$ is greater than the coupling coefficient $\eta_s$, then the second Stokes pulses will decay less rapidly than the first Stokes pulses.

Although described above for a pulse repetition rate of 363.5 kilohertz, corresponding to the loop transit time of 2.74 microseconds, the pulse repetition rate or frequency can be advantageously increased to a multiple of the loop transit frequency. For example, the pulse repetition frequency can be increased to 4.36 MHz so that 12 independent pump pulses are circulating in the loop portion 104 at any given time. The pump pulses for this example would be spaced in time (T in FIG. 2) by approximately 228 nanoseconds. Thus, at higher pump pulse rates, the pump pulse width (W in FIG. 2) is advantageously decreased so that the pump pulses do not overlap. For example, the pump pulse width can be decreased to approximately 100 nanoseconds. Although the number of pump pulses circulating in the loop portion 104 at any one time has increased, one skilled in the art will understand that a recirculating laser signal at the first Stokes wavelength will only be synchronized with and thus affected by every 12th pump input pulse. Furthermore, at any one time, there will be twelve independent laser signal pulses circulating in the loop portion 104 at any one time. The pump repetition rate can be increased further by increasing the bandwidth of the acousto-optic Bragg cell 150 and the acousto-optic driver 152 so that they will switch at a higher repetition rate and still pass a sufficient peak pump power. In alternative embodiments, not shown, the signal pulse generator 112 can be replaced with a mode-locked laser pump source that operates at a frequency of, for example, in the range of 100 megahertz so long as the pump repetition rate is selected to be an integer multiple of the loop transit frequency, thereby synchronizing the stimulated recirculating signal pulses with the input pump input pulses.

Figures 11A, 11B:
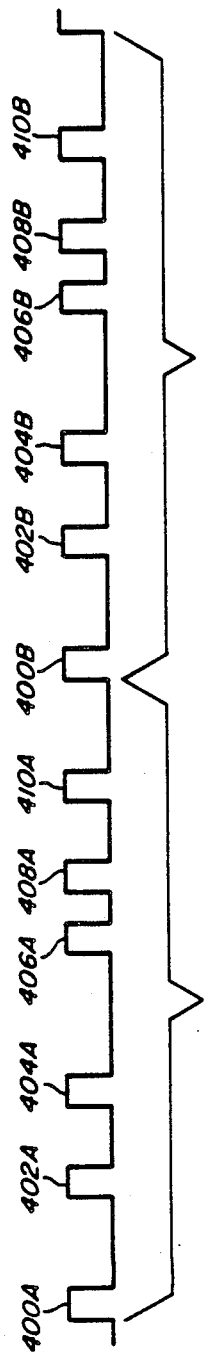
FIGS. 11A and 11B illustrate first and second series, respectively, of irregularly spaced pulses forming pulse trains wherein the pulses in the second series (FIG. 11B) are spaced apart from the pulses in the first series (FIG. 11A) by the loop transit time at the Stokes wavelength.

While the preferred embodiment was described in terms of an input pump pulse train having equal pulse spacings, it will be understood that other pump pulse patterns may be utilized to provide the synchronous pumping previously discussed. For example, FIG. 11A represents a first pump pulse pattern comprising a series of irregularly spaced pump pulses, 400A, 402A, 404A, 406A, 408A, 410A, while FIG. 11B represents a second pattern of pump pulses 400B, 402B, 406B, 408B, 410B, having the same irregular spacing as the first pattern, but spaced in time from the first pattern such that each pulse in the second pattern is delayed from the corresponding pulse of the first pattern by a time equal to one loop transit time T at the Stokes wavelength. Thus, each of the patterns is one loop transit time T in duration and each of the corresponding points on the patterns are separated by one loop transit time T. Other types of pump pulse patterns will be apparent to those skilled in the art. Another rather extreme example of an alternative pattern is one which includes a single pump pulse. In such case, the patterns may be any multiple of one loop transit time in duration, and may be separated by any multiple of one loop transit time.

The synchronously pumped all-fiber ring Raman laser of the present invention provides a synchronous signal output at a wavelength that is shifted from an input pump wavelength. The disclosed laser operates at subwatt thresholds at the near-infrared region. The laser uses a fiber coupler having a high multiplexing effect to form a reentrant loop to provide a low-loss ring fiber cavity for the stimulated Stokes signals, while providing an efficient utilization of the pump power. The efficient utilization of the pump power is accomplished by selecting a coupling coefficient for the pump optical wavelength that is substantially equal to zero so that substantially all of the pump signal is input into the loop for circulation therein. In addition, the selected coupling ratio for the pump power wavelength causes the pump power to circulate only once through the loop, thus preventing overlap of the pump pulses. This substantially eliminates gain fluctuations and thus results in an enhanced output signal stability. By extending the pump pumping time to 50 milliseconds, as described herein, the stimulated Stokes pulses can recirculate in the loop approximately 18,000 times, which corresponds to an optical pulse propagation distance of over $10^7$ meters. By adjusting the coupler 110, Stokes pulses at a second Stokes wavelength of 1.18 microns can be generated. Synchronous pumping of the ring fiber laser at harmonics of the loop transit frequency permits the generation of Stokes pulse trains at a repetition rate up to 4 million times per second. It is believed that this is the first all-fiber ring laser having these capabilities.

What is claimed is:

1. An apparatus for generating a laser signal comprising:
   a source of pump optical energy at a first wavelength for producing plural energy bursts that are spaced apart in time by a selected time interval;
   a length of optical fiber for receiving said series of energy bursts, said length of optical fiber forming a loop; and
   a coupler for coupling said energy bursts to said loop to propagate in said loop to pump said fiber and cause emission of optical energy in said fiber at a second wavelength that is shifted from said first wavelength, and thereby provide a laser signal at said second wavelength, said coupler having a first coupling ratio at said first wavelength such that substantially all of the energy in said energy bursts is coupled into said loop, said coupler further causing substantially all of the energy bursts traversing said loop to exit said loop without recirculating in said loop, said coupler having a second coupling ratio different from said first coupling ratio such that said laser signal recirculates in said loop, said laser signal having a loop transit time related to said time interval such that a multiple of the loop transit time is substantially equal to a multiple of said time interval.

2. The apparatus as defined in claim 1, wherein said source of pump optical energy is a laser signal source that generates optical energy at said first wavelength and wherein said pump energy bursts are formed by modulating said optical energy to create a modulated waveform.

3. The apparatus as defined in claim 2, wherein said modulated waveform is a pulse.

4. The apparatus as defined in claim 3, wherein said pulse switches between an energy level substantially equal to zero and a predetermined maximum energy level.

5. The apparatus as defined in claim 1, wherein said emission of optical energy at said second wavelength is the result of Raman scattering.

6. A fiber optic apparatus, comprising:
   an optical fiber forming a loop for recirculating an optical signal in said loop, said optical fiber loop comprising an active material which emits photons at a first wavelength in response to optical pumping of said active material to an excited state by light at a second wavelength to generate light at said first wavelength;
   a fiber optic coupler for inputting a pump light signal at said second wavelength to said loop for propagation therethrough to optically pump said active material to said excited state and cause emission of said photons at said first wavelength, said coupler having a coupling ratio which is different for said first wavelength than for said second wavelength such that a first fraction of said light at said first wavelength exits said loop after propagation therethrough, and a second fraction of light at said wavelength exits said loop after propagation therethrough, said second fraction close to 1.0 and substantially greater than said first fraction; and
   a source of light for producing said pump light signal, said pump light signal comprising a series of energy bursts at a wavelength substantially equal to said second wavelength to cause said emission of said photons at said first wavelength and generate a series of corresponding energy bursts at said first wavelength at said lop, said energy bursts of said second wavelength spaced apart in time such that each of said energy bursts of said first wavelength arrives at said coupler at substantially the same time as said energy bursts of said second wavelength.

7. The apparatus of claim 6, wherein said active material comprises a silica optical fiber.

8. The apparatus of claim 6, wherein said photons are generated by stimulated Raman scattering.

9. A fiber optic laser comprising:
   a source of pump optical energy at a pump frequency;
   means for modulating said pump optical energy to generate a series of pump pulses that are spaced apart in time by a selected time interval;
   a single, uninterrupted length of optical fiber, having an input end portion, an output end portion, and a loop portion disposed between said input end portion and said output end portion, said input end portion positioned to receive said pump optical energy from said source and to propagate said pump optical energy to said loop portion so that said pump optical energy propagates in said loop portion, said loop portion responsive to said pump optical energy propagating therein to emit stimulated optical energy at a laser frequency that is shifted in frequency from said pump frequency that is characteristic of said optical fiber; and
   means for coupling light from said input end portion to said loop portion, and from said loop portion to said output end portion, said loop portion having a length selected so that said pump optical energy traverses said loop portion in substantially the same amount of time as said selected time interval, said coupling means having a first coupling ratio at said pump frequency that is selected to prevent substantial amounts of the optical energy at said pump frequency from recirculating in said loop, said coupling means having a second coupling ratio at said laser frequency that is selected to cause a substantial portion of the optical energy at said laser frequency to recirculate in said loop as recirculating laser optical energy, said recirculating laser optical energy stimulating additional optical energy at said laser frequency in phase with said recirculating laser optical energy, the magnitude of the energy at said laser frequency thereby increasing with each recirculation until a steady-state magnitude is reached.

10. The laser as defined in claim 9, wherein said coupling means comprises first and second coupling portions of said optical fiber, said first and second coupling portions positioned in close proximity so that optical energy is coupled between said first and second coupling portions through evanescent field interaction.

11. The laser as defined in claim 10, wherein said optical fiber as an inner core and an outer cladding, a portion of said outer cladding being remoed from said optical fiber to form a first facing surface proximate to a first portion of the core of the fiber, and a portion of said outer cladding being removed from said optical fiber to form second facing surface proximate to a second portion of the core of the fiber, said first facing surface and said second facing surface positioned in juxtaposed relationship so that optical energy is transferred between the core portion proximate to said first facing surface and the core portion proximate to said second facing surface.

12. The laser as defined in claim 9, wherein said stimulated optical energy is caused by Raman scattering.

13. The laser as defined in claim 9, wherein said second coupling ratio is greater than 0.5 and said first coupling ratio is close to 1.0.

14. An apparatus, comprising:
a loop comprised of optical fiber, and including an active material which is capable of being pumped to an excited state by light of a first wavelength and emitting light of a second wavelength in response to said pumping;
a source of pump optical energy at said first wavelength for providing plural sequential pump energy bursts, said source coupled to said loop to introduce said pump energy bursts into said loop to pump said active material to said excited state so as to emit photons and thereby generate corresponding signal energy bursts at said second wavelength, each of said plural pump energy bursts having a duration shorter than one transit time of said loop at said second wavelength, said pump energy bursts forming a first energy burst pattern and a second energy burst pattern, each of said patterns having a duration of one loop transit time or multiple thereof at said second wavelength, and including at least one pump energy burst, each energy burst in said first pattern separated in time from a corresponding energy burst in said second pattern by a loop transit time at said second wavelength or multiple thereof.

15. The apparatus of claim 14, wherein said active material comprises a silica optical fiber.

16. The apparatus of claim 14, wherein said photons are generated by stimulated Raman scattering.

17. An apparatus, comprising:
a loop of optical fiber for propagating light, said loop having a loop propagation time that is a function of the wavelength of light propagating therein;
a source of light for generating a pump signal comprising a series of at least first and second adjacent optical energy bursts spaced apart in time by a time interval, and at least third and fourth adjacent optical energy bursts spaced apart in time by said time interval, said pump signal being at a first optical wavelength; and
a coupler for coupling said pump signal into said optical fiber loop so that said pump signal propagates in said loop, said pump signal causing emission of optical energy in said fiber at a second optical wavelength, shifted from said first optical wavelength, to provide a laser signal at said second wavelength, said coupler recirculating said laser signal at said second wavelength in said loop and outputting a fraction of said laser signal from said loop to provide an output signal, said source of light timing said third and fourth energy bursts to arrive at said loop subsequent to said first and second energy bursts, respectively, by a time equal to a multiple of the loop propagation time for said second wavelength.

18. In a fiber optic device comprised of optical fiber, said device having an input end portion, a loop portion and an output end portion, and further comprising a coupler for coupling energy between said input end portion, said loop portion and said output end portion, a method of producing an optical output signal comprising the steps of:
generating an optical pump signal at a pump frequency, said pump signal comprising bursts of optical energy spaced apart in time by a selectable time interval;
inputting said optical pump signal to said input end portion to provide an input pump signal;
coupling substantially all of said input pump signal to said loop portion to propagate in said loop portion so that said loop portion emits optical laser energy in response to said pump optical energy, said emitted optical laser energy being at a laser frequency that is characteristic of said optical fiber;
coupling substantially all of said pump signal in said loop portion to said output end portion so that said pump signal does not recirculate in said loop portion; and
propagating said emitted optical laser energy to said coupler and coupling a first portion of said emitted optical laser energy to said output end portion as an output signal at said laser frequency, and coupling a second portion of said emitted optical laser energy back to said loop portion to recirculate therein as a recirculating optical signal, said recirculating optical signal traversing said loop portion in a transmit time determined by the length of said loop portion and the wavelength of said optical signal; and
selecting said time interval between said bursts of optical energy to be substantially equal to the transit time of said recirculating optical signal.

19. The method as defined in claim 18, wherein said input end portion, said loop portion, and said output end portion of said optical fiber comprise a single, uninterrupted length of optical fiber having an inner core and an outer cladding and wherein said coupler comprises a first facing surface formed on said fiber between said input end portion and said loop portion and a second facing surface formed on said fiber between said loop portion and said output end portion, said first and second facing surfaces juxtaposed so that optical energy is transferred between said input end portion and said output end portion at said facing surfaces.

20. A method of generating an optical output signal, comprising the steps of:

generating a pump signal comprising a series of at least first and second adjacent optical energy bursts spaced apart in time by a time interval, and at least third and fourth adjacent energy bursts spaced apart in time by said time interval, said pump signal being at a first optical wavelength;

inputting said first and second energy bursts into a loop of optical fiber, said loop having a loop propagation time for light propagating therethrough, said propagation time being a function of the wavelength of said light;

propagating said first and second energy bursts in said optical fiber loop to optically pump said fiber, and cause emission of optical energy in said optical fiber at a second optical wavelength, shifted from said first optical wavelength, to provide a laser optical signal at said second wavelength;

inputting said third and fourth adjacent energy bursts into said loop;

timing said third and fourth energy bursts to arrive at said loop subsequent to said first and second energy bursts, respectively, but a time equal to a multiple of the loop propagation time for said second wavelength;

recirculating said laser optical signal at said second wavelength in said loop; and outputting a fraction of said laser optical signal from said loop to provide said output signal.

21. The method of claim 20, wherein said propagating step comprises stimulating emission of optical energy at said second wavelength by Raman scattering.

22. The method of claim 20 wherein said propagating step includes the step of outputting substantially all of said pump signal from said loop after said pump signal has traversed said loop one time to avoid recirculation of said pump signal in said loop.

23. The method of claim 20, wherein said propagating step comprises pumping said fiber to cause said recirculating laser optical signal to have a sufficiently high intensity to pump said optical fiber to cause emission of optical energy in said optical fiber at a third wavelength shifted from said second wavelength.

24. The method of claim 20, wherein said propagating step further comprises stimulating emission of optical energy at said third wavelength by Raman scattering.

* * * * *